(12) United States Patent
Bennett

(10) Patent No.: US 11,547,916 B2
(45) Date of Patent: Jan. 10, 2023

(54) INDOOR-TRADITIONAL CLIMBING DEVICE COVER

(71) Applicant: Hilton Bennett, Richmond, VA (US)

(72) Inventor: Hilton Bennett, Richmond, VA (US)

( * ) Notice: Subject to any disclaimer, the term of this patent is extended or adjusted under 35 U.S.C. 154(b) by 261 days.

(21) Appl. No.: 16/852,582

(22) Filed: Apr. 20, 2020

(65) Prior Publication Data

US 2020/0338421 A1    Oct. 29, 2020
US 2022/0347539 A9    Nov. 3, 2022

Related U.S. Application Data

(60) Provisional application No. 62/865,932, filed on Jun. 24, 2019.

(51) Int. Cl.
| | |
|---|---|
| *A63B 69/00* | (2006.01) |
| *B29C 70/34* | (2006.01) |
| *B32B 5/02* | (2006.01) |
| *B32B 5/26* | (2006.01) |
| *B32B 37/00* | (2006.01) |
| *B32B 39/00* | (2006.01) |
| *B29L 31/00* | (2006.01) |

(52) U.S. Cl.
CPC ........ *A63B 69/0048* (2013.01); *B29C 70/342* (2013.01); *B32B 5/022* (2013.01); *B32B 5/26* (2013.01); *B32B 37/0046* (2013.01); *B32B 39/00* (2013.01); *B29L 2031/771* (2013.01); *B32B 2262/0276* (2013.01); *B32B 2262/0284* (2013.01); *B32B 2367/00* (2013.01); *B32B 2605/003* (2013.01)

(58) Field of Classification Search
CPC ................................................. A63B 69/0048
See application file for complete search history.

(56) References Cited

U.S. PATENT DOCUMENTS

| | | | |
|---|---|---|---|
| 6,540,645 B1 * | 4/2003 | Zeilinger | A63B 69/0048 482/37 |
| 7,594,874 B2 * | 9/2009 | Meissner | A63B 69/0048 482/37 |
| 10,646,751 B2 * | 5/2020 | Bennett | A63B 29/024 |
| 2007/0164182 A1 * | 7/2007 | MacKay | A63B 69/0048 248/300 |
| 2007/0191188 A1 * | 8/2007 | Collins | A63B 69/0048 482/37 |
| 2017/0296877 A1 * | 10/2017 | Bennett | A63B 69/0048 |

* cited by examiner

*Primary Examiner* — Jennifer Robertson
(74) *Attorney, Agent, or Firm* — WCF IP

(57) ABSTRACT

Traditional climbing is being sought out by more indoor climbers, however the issue that has arisen is that the only way to learn the method is through trial and error in the outdoors on real rock. An indoor-traditional climbing device (I-TCD) makes it possible to learn how to climb Traditionally in a safe environment with hands on instruction. Provided herein is a cover/shield for an I-TCD that allows not only for the placement of multiple kinds of gear within the I-TCD body, but it allows the climber to fall on that gear placement safely to determine the quality of their gear placement, without the risk of falling upon the I-TCD body. Therefore, the cover/shield provides an angled feature to reduce direct impact injuries while increasing the opportunity for climbers who wish to learn how to climb traditionally.

19 Claims, 22 Drawing Sheets

INDOOR-TRADITIONAL CLIMBING DEVICE COVER

CROSS-REFERENCE TO RELATED APPLICATIONS

This application claims priority to U.S. Provisional Application 62/865,932 filed Jun. 24, 2019, the complete contents of which is incorporated herein by reference in its entirety.

FIELD OF THE INVENTION

The present invention is in the technical field of Traditional Rock Climbing. This invention relates to indoor and natural rock anchoring devices. It particularly relates to the use of an external cover over a frame having one or more internal components. The frame mounted to a new or existing structural frame, to simulate a traditional or outdoor climbing environment while maintaining a gym "feel".

BACKGROUND

Traditional Rock Climbing (also referred to as "Trad" Climbing, is normally only accessible in outdoor environments at a great risk of life and limb to the learner, who relies solely on a training that never allowed the trainee to safely fall test their gear placement to determine whether their placement was proper or adequate. However, as the sport of rock climbing progresses and indoor traditional climbing devices are developed, such as those disclosed in U.S. application Ser. No. 15/485,489 incorporated herein by reference, the need has arisen for a covering of these devices, or a manner by which to "blend" these devices into indoor climbing walls.

Indoor climbing gyms have made great progress in teaching other forms of climbing indoors to include: bouldering (Low Wall climbing up to 30 feet, no rope required), top-roping (the most common form of indoor climbing whereby a climber is tethered into a harness, which is attached to a rope, which is attached to the highest point of the climb, the opposite end of which is attached to a belayer on the ground who will become responsible for the safety of the climber. Ensuring their ascent and descent is controlled by tensioning of the rope through an ATC, Smart Device, Gri-gri, or other form of belay device); sport climbing (whereby the climber is belayed in line with their belayer while the climber maintains placement of the rope through specific anchor points (bolt hangers) by clipping first a quick draw into the anchor point and then the rope into the quick draw), ice climbing (is equitable to sport climbing only the rock is a mixture of rock and ice or only ice and the probability exists that the climber must either place their own anchor points, climb by axe and crampon, or top-rope) and aid climbing (which consists of using set anchor points to allow for a rope ladder type of climb to transition between each anchor point). The great barrier with bringing Traditional Climbing into a gym environment is the need for a feature that can withstand a substantial tensioning and impact force simultaneously, whilst not defeaturing the surface of the climbing wall, nor endangering the life of the climber and belayer, or other gym patrons.

SUMMARY

In some embodiments, the Indoor-Traditional Climbing Device's (I-TCD) Cover functions as a way to provide a blending of the I-TCD into the existing climbing wall, and be, through material components and design, capable of creating climbing hold affix-ments for Climbing Holds on indoor climbing walls, in a similar manner as "Volumes" so that the I-TCD is not a "block on the wall", a "shelf", or an "eye sore" on the climbing wall.

In some embodiments, the I-TCD Cover's differentiator is its exterior shape change/variation in relation to its unchanged interior shape designed specifically to the shape of the I-TCD disclosed in U.S. application Ser. No. 15/485, 489, and it's various forms; to include the shape of device attachments specific to the I-TCD.

Both embodiments maintaining the I-TCD feature which allows access to an internal area which can receive Traditional Climbing Gear.

Traditional climbing gear is inclusive of: Cams, Tri-Cams, Nuts, Off-set Cams, Aid Climbing Gear, and future Traditional climbing gear (as its current forms are improved upon). The I-TCD when properly installed becomes a Primary standard anchoring placement for Sport Climbing Gear, and then provides a Secondary-becoming Primary anchor during the placement of Traditional Gear. Specifically described as the "Hanger" being the first anchor point (by standard: see Sport Climbing Reference) and therefore the Primary Anchor point. This feature provides a point of anchor for the climber while the Traditional gear is placed above the "Hanger" feature, between the "Stones". The "Stones" can be changed by a setter to create a variety of features and thereby accommodate a full range of Traditional Climbing Gear as noted above without having to remove the I-TCD from its placement. Additionally, the "Stones" placement in the I-TCD can be modified by a torsion actuated component on the I-TCD Cover to enable a setter to adjust the accepted gear range in smaller increments. And/Or, the "Stones" placement can be modified by a "Quick Release" Mechanism on the I-TCD Cover to enable easy removal of tightly placed, wedged, or stuck gear.

The I-TCD Cover creates a "Helmet" of sorts around the I-TCD Device, while maintaining the open area to receive Gear Placements, and the Anchor Fixture area for Sport Anchor Backup.

The Indoor-Traditional Climbing Device (I-TCD) Cover reduces the risk associated with an Indoor Fall on a "blocky", or "shelf like" feature, while protecting the introduction of the technique of traditional climbing to indoor climbing gyms. This will be accomplished without preventing indoor gym routes from being climbed by Sport or Top-rope Climbers, and without requiring gyms to re-design or refurbish their current wall structure.

Currently there doesn't exist in the market a device of this nature for this use.

The I-TCD Cover is an exterior shell, covering a frame; formed of a material or combination of materials to form a single body. That body designed to cap, shield, cover or house an Indoor Traditional Climbing Device (I-TCD), (as disclosed in U.S. application Ser. No. 15/485,489 incorporated herein by reference), and allow for a fixed or multi-directional insertion of a cam, nut, tri-cam, or various other pieces of traditional climbing gear either in use now or to be designed in the future, as well as access to a safety point or an additional hanger to allow for a climber to attach sport gear (quick draw) as their anchor point (until traditional gear is placed).

The I-TCD Cover can be of a single piece and fit directly over the I-TCD body (normal direction to body), to be screwed, bolted or fixated to the indoor climbing wall;

and/or it can be of two pieces to encase the body from opposing directions, or of multiple pieces to encase the body from multiple directions.

In manufacturing terms, the process of manufacturing can be by CNC Machining from a single piece of material or by building up the body in layers using additive manufacturing practices.

The I-TCD Cover could, if given exterior resurfacing, itself be used as a climbing hold, and along the same lines of progression, form an exterior "Volume" about the I-TCD which would leave the "Stone" surface of the I-TCD visible at the point of contact to the variety of traditional gear. This "Volume" would act as a surface adaption and/or transition in surface over a distance to create or become a continuation of existing wall features such as a "Slab" feature (angled surface less than 90 degrees and greater than 3 degrees) to remove the "shelf" landing risk.

Additionally, given the rise of climbing competitions and the move for Bouldering, Top Roping and Speed Climbing to be events in the 2020 Olympics, there will foreseeably be the day when Indoor Traditional Climbing sees its day at similar competitions. This projection suggests that having a way for referees to know that a climber has reached a particular point would be to have that point "signal" that such has occurred. Thus, the Shield may house touch, vibration, frequency or other sensors, and auditory and visual alerts as a result of such sensor, such that when touched the Shield will light up, give off an auditory alert, and or send that information to receiver to record the "point".

Embodiments of the disclosure provide a device to be attached to an indoor traditional climbing device body or to a structure that simulates an outdoor climbing environment capable of receiving Traditional climbing gear to remove the risk of falling on a "Shelf" like feature, while maintaining an indoor climbing feel.

BRIEF DESCRIPTION OF THE DRAWINGS

FIG. 7 also shows the Bottom Plate Cavity for Anchor (102) which provides a location for a Quick Draw, to hang from the Tab (101) without restriction as a Primary point of anchor until a piece of gear is placed.

FIG. 10 also shows the entry for the INTERNAL CAPTURING NUTS (902), and the Rear Cavity of the I-TCD Cover which allows for the body to be suctioned to the Climbing Wall Surface by the mechanics of the compression of the I-TCD Cover on the Climbing Wall Surface by the securing of the I-TCD

FIG. 19 also depicts a manufacturing, and assembly process for the I-TCD COVER/SHIELD (900) that would allow it to be manufactured in smaller pieces to be assembled into the larger body, while maintaining the shape specific cavity to receive the body of (100)

Figure 23:
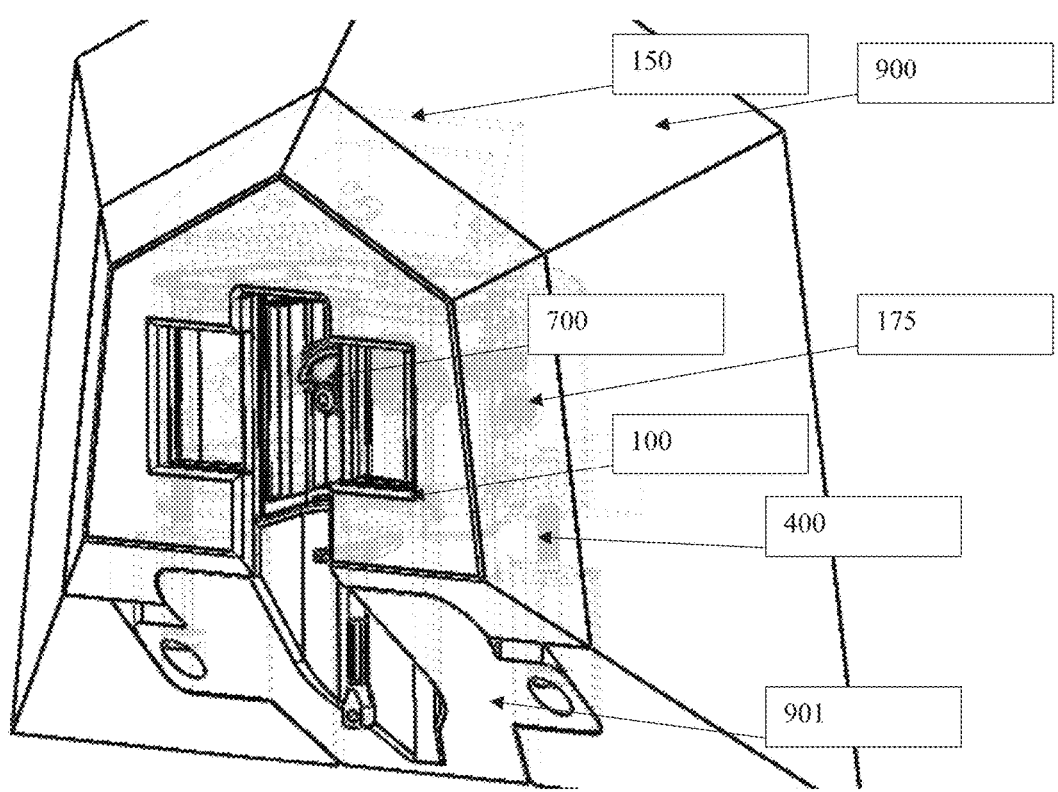
FIG. 23 shows the embodiments of FIG. 17 within the embodiment of FIG. 7 demonstrating that the Plurality of attachments to (100) can be encapsulated into a version of the I-TCD Cover (900), such that the user can have the embodiments of FIG. 17 attached to the climbing wall and without removing the Volumetric attachments (150 & 175) add to the configuration the embodiment of (900), and retain the sum of the bodies with the Bottom Plate (901) via the Bolt (400) which would be captured by the Internal Capturing Nut (902).

Also shown in FIG. 23 is the Cam (700) between the Stones (200) with the Cam's length freely suspended in the Bottom Plates Cavity such that a Carabiner and Rope could hang without impedance.

Figure 24:
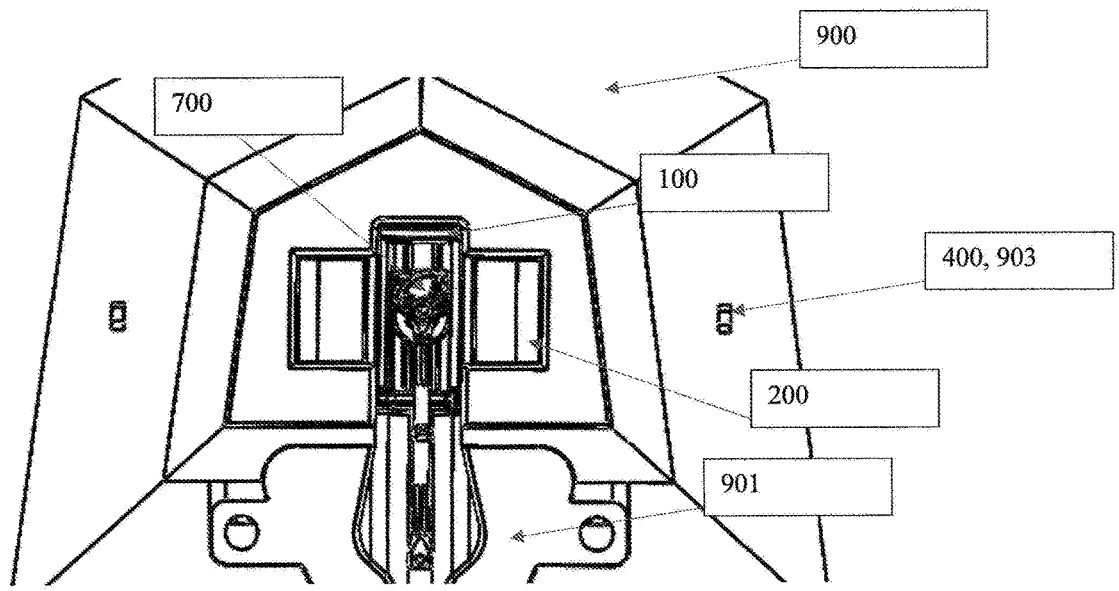

FIG. 24 shows the Side Access Points through which a Bolt (400) symmetrically enters the I-TCD Shield/Cover (900), accessing through the I-TCD Side Volume (175) to contact the Stones (200) in such a way as to apply enough pressure to decrease the "gap" between the Stones where the Cam (700) is retained such that a smaller Cam would be required to create a point of anchor.

Figure 25:
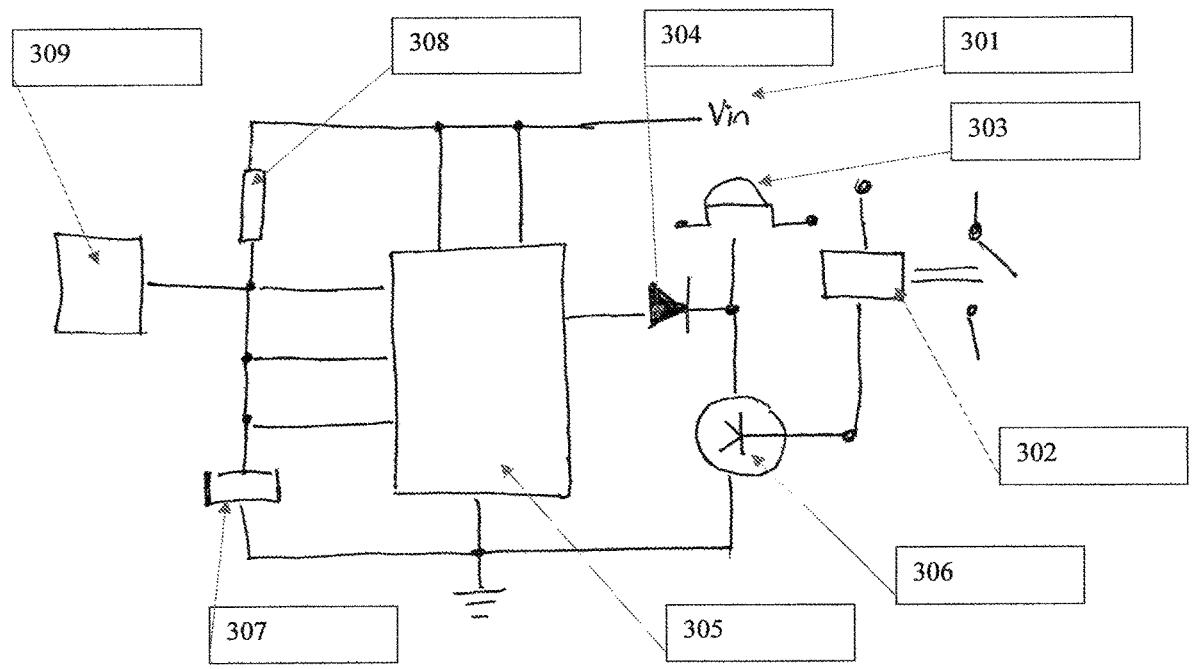

FIG. 25 depicts an example circuit for the Sensor (309), Light (304), auditory response—Buzzer (303) using Battery (303) Power.

DETAILED DESCRIPTION OF THE INVENTION

The embodiments described herein can advantageously be used in a wide variety of simulation, training, and practice associated with indoor traditional climbing devices. In particular, the indoor traditional climbing device covers described herein can be installed in an indoor setting to house, protect, or shield an indoor traditional climbing device. Any of the indoor traditional climbing device covers described herein can define a simulated rock surface to blend into a man-made rock wall surface; while allowing for the placement of a variety of different traditional gear into the indoor traditional climbing device, and access to a safety anchor to allow a climber to first attach sport gear to provide safety until the traditional gear is placed. Moreover, components of the indoor traditional climbing device cover/s described herein can be easily replaced without removing the indoor traditional climbing device from the support structure. Any of the devices (or components) described herein can be added to existing support structures (e.g., climbing walls) without requiring any changes to the existing structure or wall.

In some embodiments an apparatus includes a shell (also referred to as a base plate or bottom plate), and an enclosing member (also referred to as a housing). The shell is configured to be "slipped" over the frame that is already attached to the structural support and configured to receive the enclosing member to encapsulate the frame. The shell is configured to receive the frame in such a way as to be mechanically fixed to the frame in directions perpendicular to the direction of reception. The shell is configured to be irremovable from the frame when the enclosing member has been secured to the shell.

In some embodiments an apparatus includes a plurality of shell members that enclose the frame from multiple directions ultimately creating a singular body that envelopes the frame. This plurality of shell members is configured to receive the frame in such a way as to be mechanically fixed to the frame in directions perpendicular to each member/s direction of enveloping the frame.

In some embodiments an apparatus includes a shell, and an enclosing member. The shell is configured to be "slipped" over the frame that is already attached to the structural support and configured to receive the enclosing member to encapsulate the frame. The shell is configured to receive the frame in such a way as to be mechanically fixed to the frame in directions perpendicular to the direction of reception. The shell is configured to be irremovable from the frame when the enclosing member has been secured to the shell. The shell material is configured such that its translucence allows light to pass through it in response to touch and transmit the response to a receiver.

In some embodiments an apparatus includes a shell, and an enclosing member. The shell is configured to be "slipped" over the frame that is already attached to the structural support and configured to receive the enclosing member to encapsulate the frame. The shell is configured to receive the frame in such a way as to be mechanically fixed to the frame in directions perpendicular to the direction of reception. The shell is configured to be irremovable from the frame when the enclosing member has been secured to the shell. The shell is configured to receive an engaging member with access through the shell to the frame to apply a pressure/force to the internal frame bodies intended to receive traditional gear in such a way as to change the position of the internal frame bodies such that a different selection of traditional gear is required.

As used herein, the term "about" when used in connection with a referenced numeric indication means the referenced numeric indication plus or minus up to 10% of that referenced numeric indication. For example, the language "about 50" covers the range of 45 to 55. Similarly, the language "about 5" covers the range of 4.5 to 5.5.

As used in this specification and the appended claims, the words "upward" and "downward" refer to a direction opposite the force of gravity and in the same direction as the force of gravity, respectively. Thus, for example, the end of a simulated traditional climbing device that faces opposite the direction of gravity would be the upward (or upper) end of the device, while the end opposite the upward end would be the downward (or lower) end of the device.

Further, specific words chosen to describe one or more embodiments and optional elements, or features are not intended to limit the invention. For example, spatially relative terms—such as "upward", "downward", "beneath", "below", "lower", "above", "upper", "proximal", "distal", and the like—may be used to describe the relationship of one element or feature to another element or feature as illustrated in the figures. These spatially relative terms are intended to encompass different positions (i.e., translational placements) and orientations (i.e., rotational placements) of a device in use or operation in addition to the position and orientation shown in the figures. For example, if a device in the figures is turned over, elements described as "below", or "beneath" other elements or features would then be "above" or "over" the other elements or features. Thus, the term "below" can encompass both positions and orientations of above and below. A device may be otherwise oriented (e.g., rotated 90 degrees or at other orientations) and the spatially relative descriptors used herein interpreted accordingly. Likewise, descriptions of movement along (translation) and around (rotation) various axes includes various spatial device positions and orientations. The combination of a body's position and orientation define the body's pose.

Figure 4:
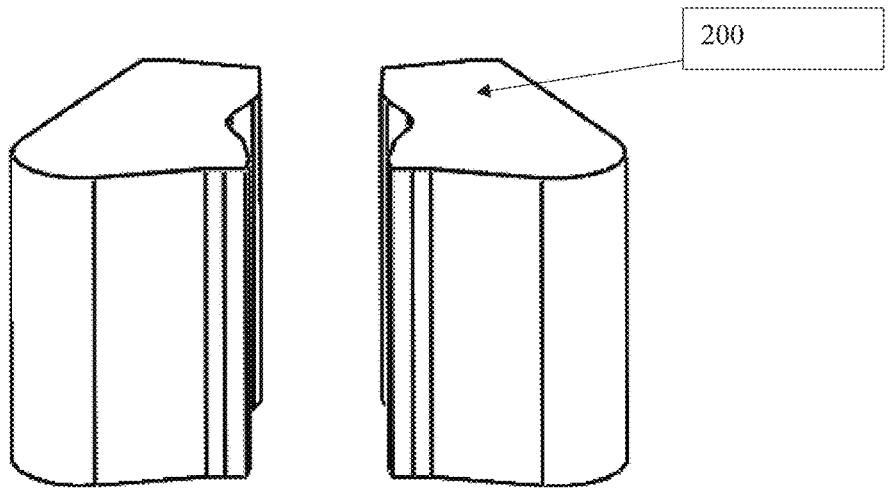
FIG. 4 is an isometric view of the I-TCD STONES (200) for FIG. 1.
Figure 5:
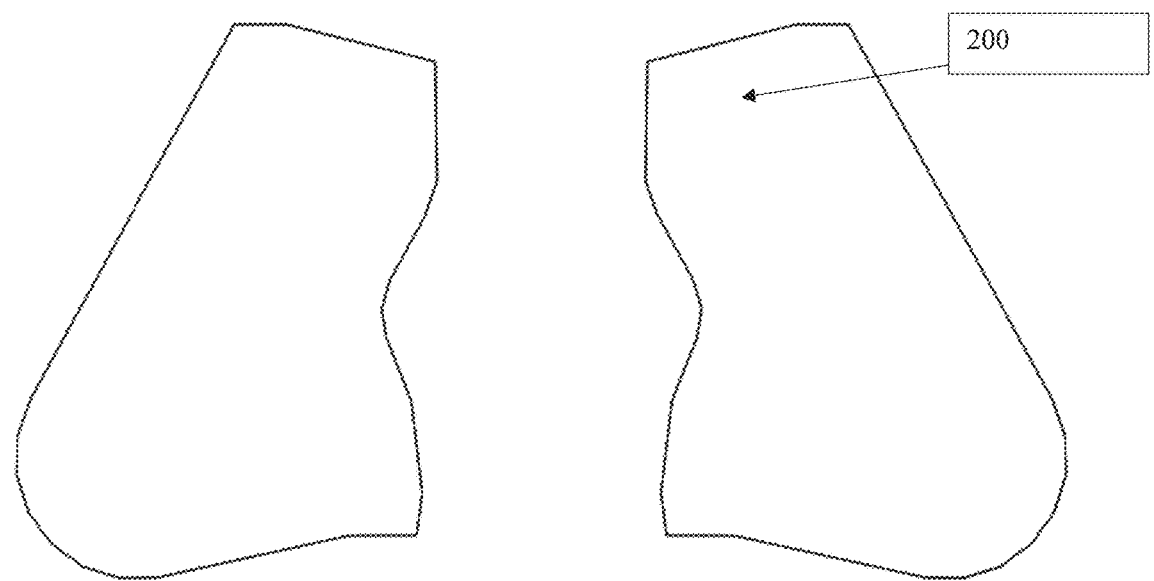
FIG. 5 is a top view of the I-TCD STONES (200) of FIG. 4

Similarly, geometric terms, such as "parallel", "perpendicular", "round", or "square", are not intended to require absolute mathematical precision, unless the context indicates otherwise. Instead, such geometric terms allow for variations due to manufacturing or equivalent functions. For example, if an element is described as "round" or "generally round," a component that is not precisely circular (e.g., one that is slightly oblong or is a many-sided polygon) is still encompassed by this description In addition, the singular forms "a", "an", and "the" are intended to include the plural forms as well, unless the context indicates otherwise. The terms "comprises", "includes", "has", and the like specify the presence of stated features, steps, operations, elements, components, etc. but do not preclude the presence or addition of one or more other features, steps, operations, elements, components, or groups Referring now to embodiments of the invention in more detail, in FIG. 1 there is shown an Indoor-Traditional Climbing Device (I-TCD) body which may be topped by the Cap of FIG. 2, after being filled with the Stones of FIG. 4. At which point the sum of these bodies (namely FIGS. 1, 2, and 4) can be Covered/Shielded by the cover 900 embodiment of FIG. 7, or a likeness thereof. In more detail, still referring to FIG. 1, the body of FIG. 2, and FIG. 4 are parts of FIG. 1, also known as the Indoor-Traditional Climbing Device (I-TCD) Body.

Figure 1:
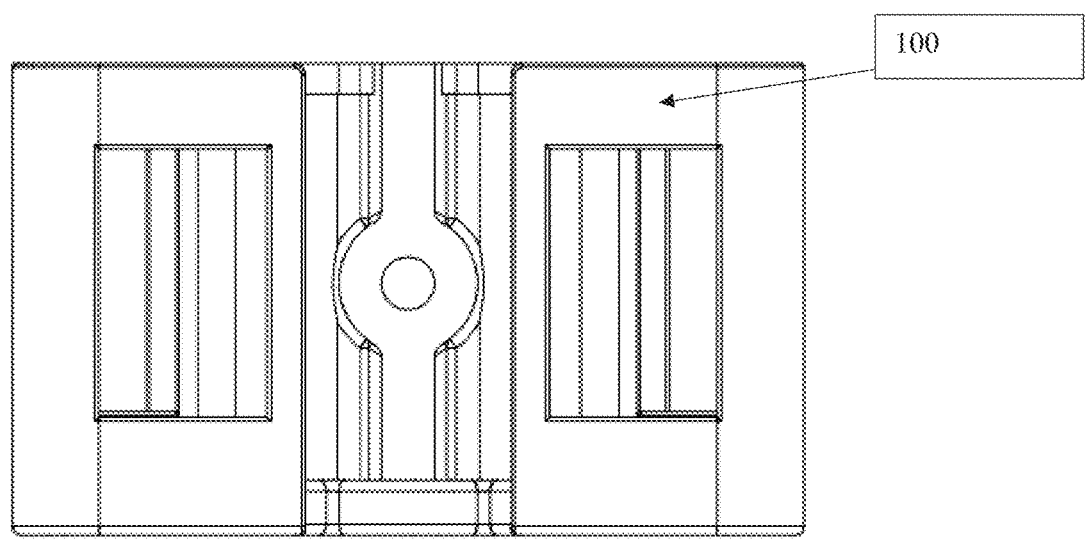
FIG. 1 is a Front view of the I-TCD (100) (Indoor Traditional Climbing Device)
Figure 2:
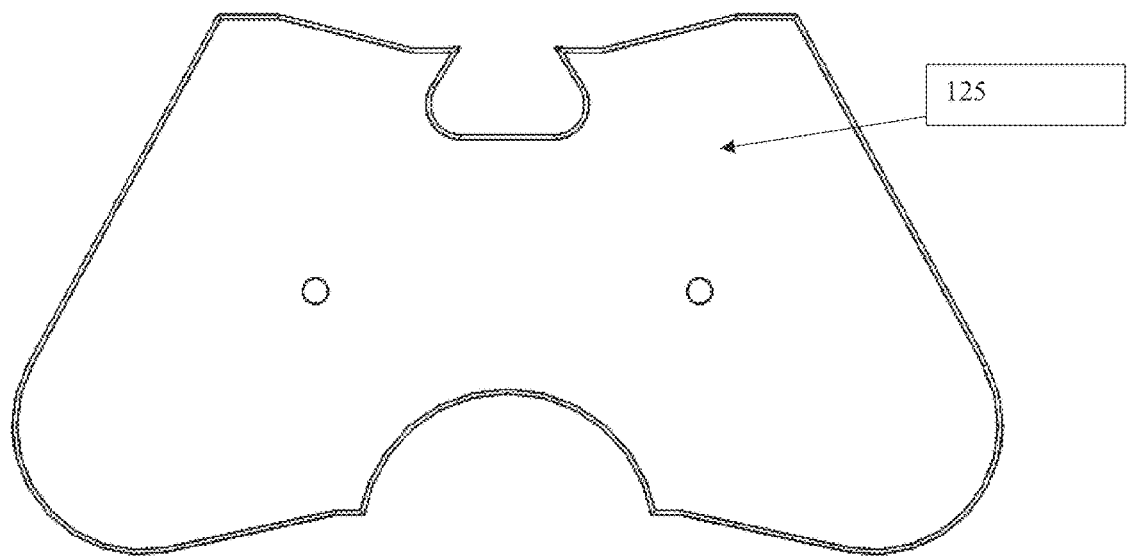
FIG. 2 is a top view of the I-TCD CAP (125) for FIG. 1.
Figure 3:
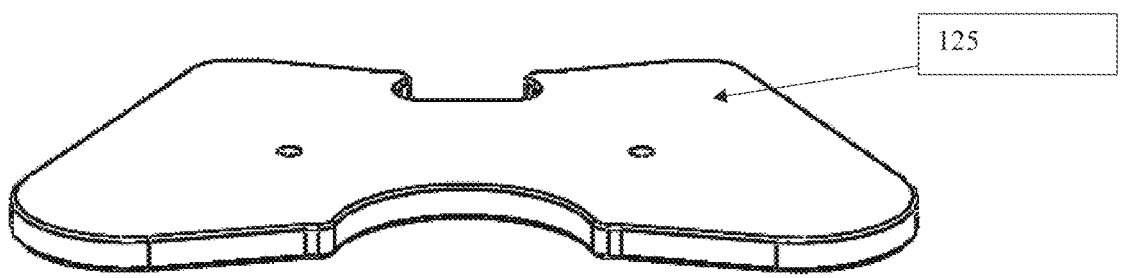
FIG. 3 is an isometric view of the I_TCD CAP (125) of FIG. 2.
Figure 6:
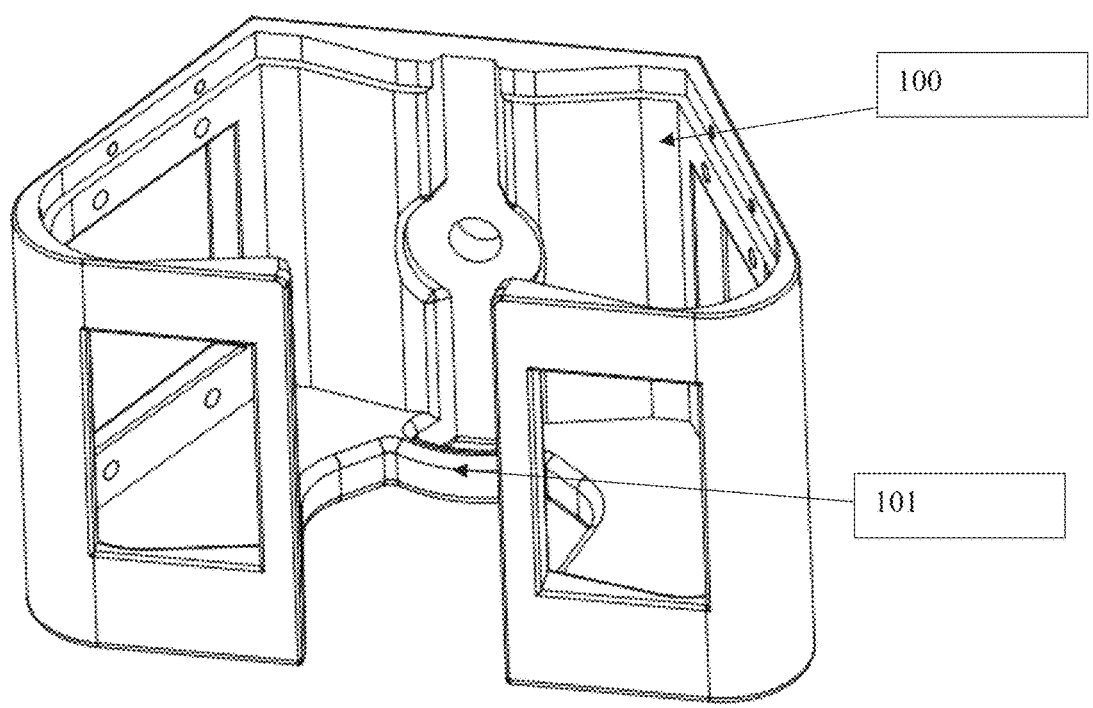
FIG. 6 is a perspective view of the Internal Opening for the Backup Tab (101) of the I-TCD (100) to receive the I-TCD Stones (200) and the I-TCD Cap (125).

FIG. 6 shows the body of FIG. 1 with the notation of item 101 which is the "loop" through which a Carabiner (Quick-Draw) is connected as a backup anchor point.

Figure 7:
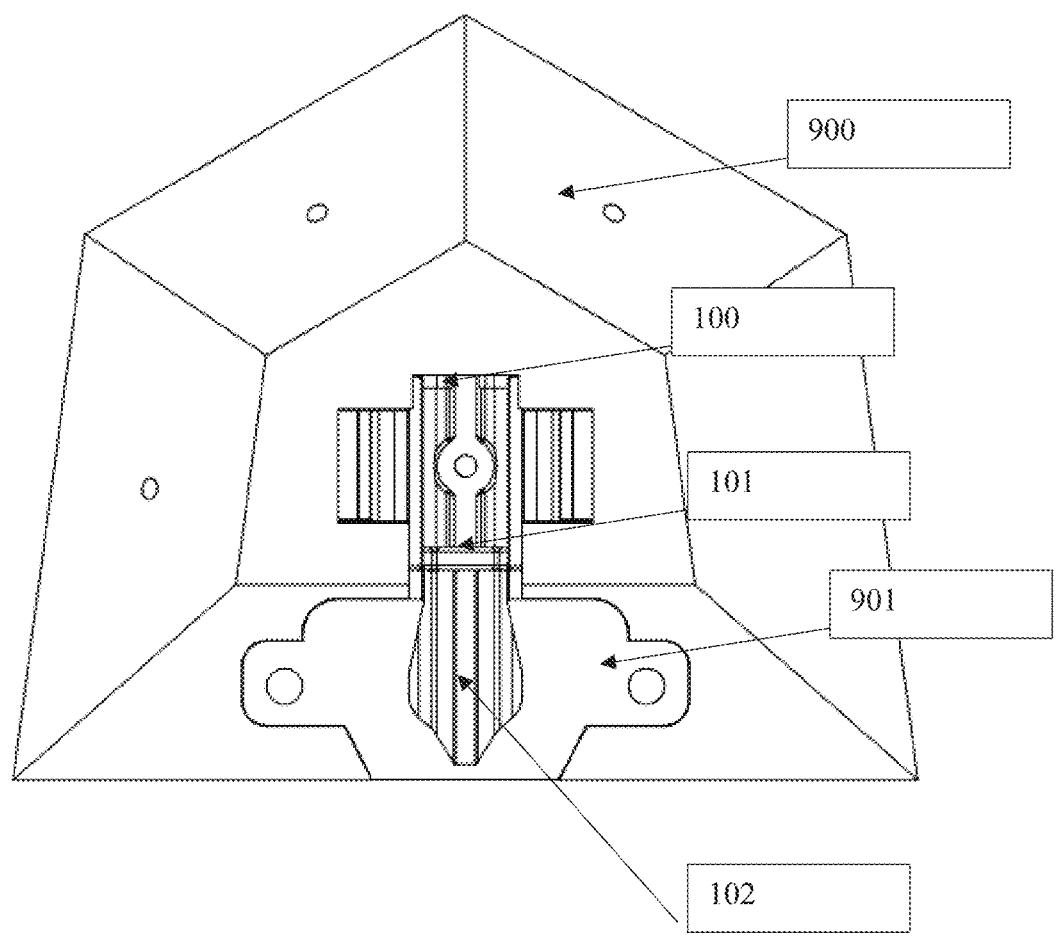
FIG. 7 is a front view of the I-TCD COVER/SHIELD (900) with the BOTTOM PLATE (901) and I-TCD (100) in place.

Referring to FIG. 7 there is shown the I-TCD COVER/SHIELD and its BOTTOM PLATE, encompassing/encapsulating the I-TCD BODY. To note is the exposed opening in the BOTTOM PLATE and SHIELD/COVER allowing for the fixation of an anchor and the placement of a piece; or pieces of Traditional Climbing Gear into the I-TCD BODY.

Figure 8:
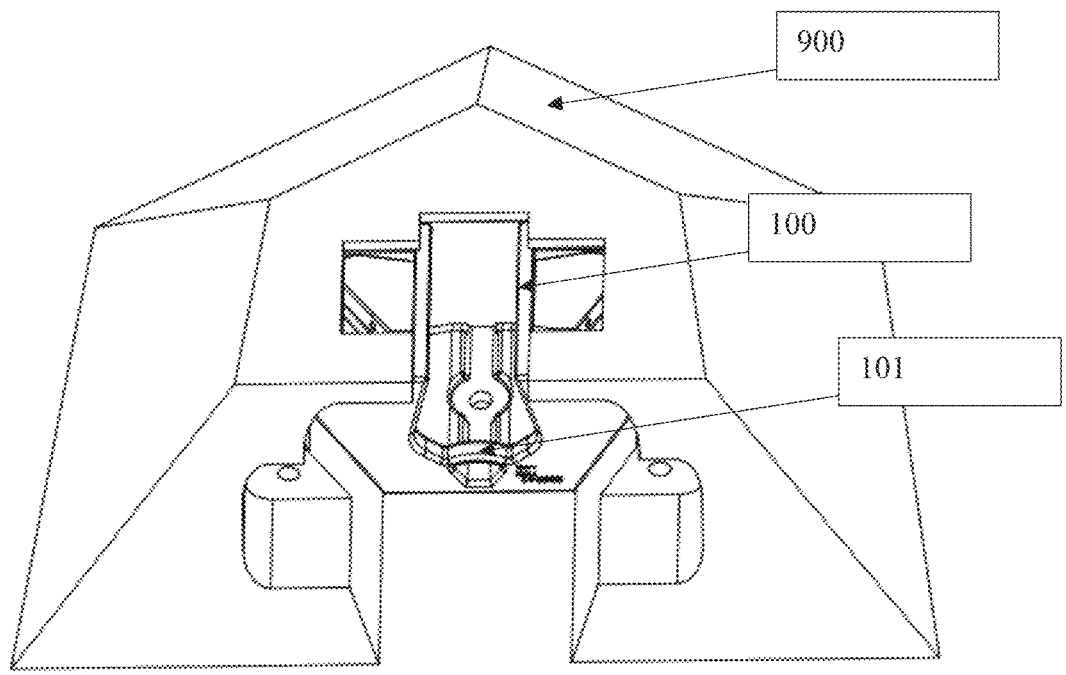
FIG. 8 is an isometric view of the I-TCD COVER/SHIELD (900) without the BOTTOM PLATE (901), and with the I-TCD (100), showing the shape specific path the I-TCD must travel to be encapsulated by the I-TCD Cover/Shield

FIG. 8 shows the ACCESS POINT which allows for the insertion of the I-TCD BODY, and the mounting points for the BOTTOM PLATE. This Access Point is specific to the I-TCD BODY in its various shapes, sizes, arrangement; with or without I-TCD BODY attachments noted in FIG. 17. This Access Point is not limited to a direction. Variations of the I-TCD Cover/Shield could position an access point for the I-TCD BODY to the Top, Left, or Right of the I-TCD Cover/Shield body so long at the Gear Access Position is directional to the opening in the I-TCD Body to allow for the Backup Anchor and the Placement of Gear.

Figure 9:
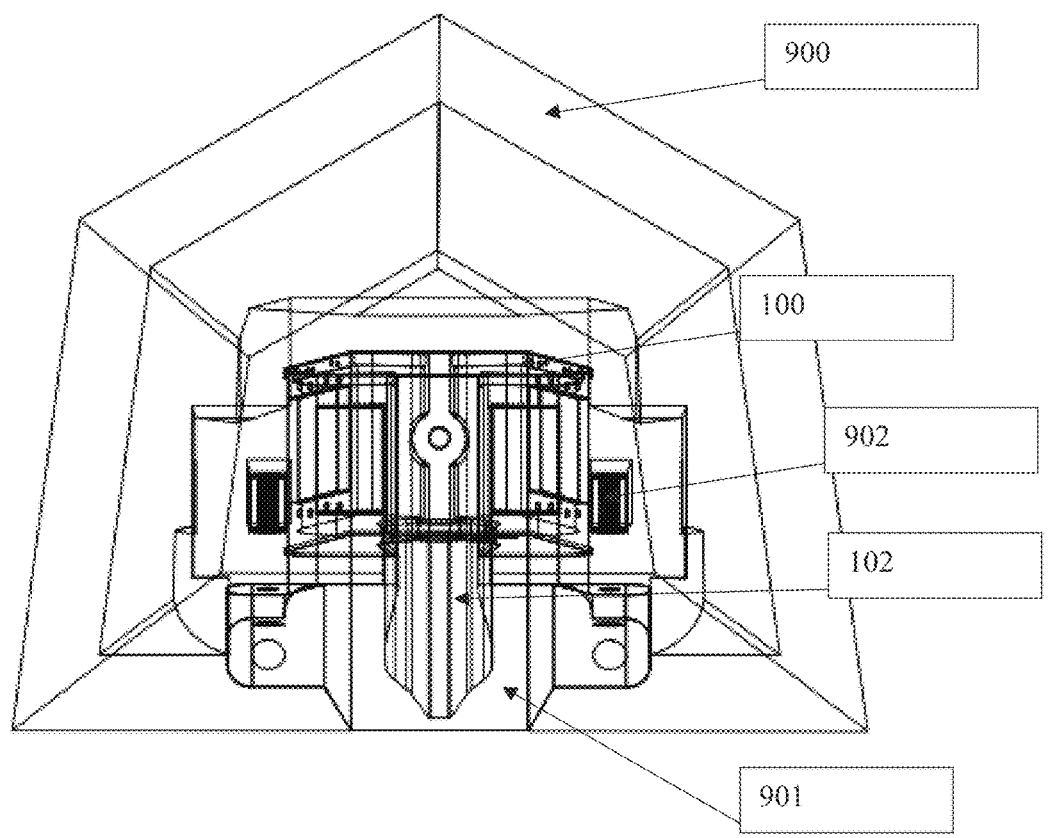
FIG. 9 is an internal view of the I-TCD COVER/SHIELD (900) with the BOTTOM PLATE (901), which is inserted after the I-TCD (100), and bound to the I-TCD Cover by the INTERNAL CAPTURING NUTS (902)

FIG. 9 shows an interior view of the I-TCD COVER/SHIELD, specifically the method of attachment for the BOTTOM PLATE, into INTERNAL CAPTURING NUTS.

Figure 15:
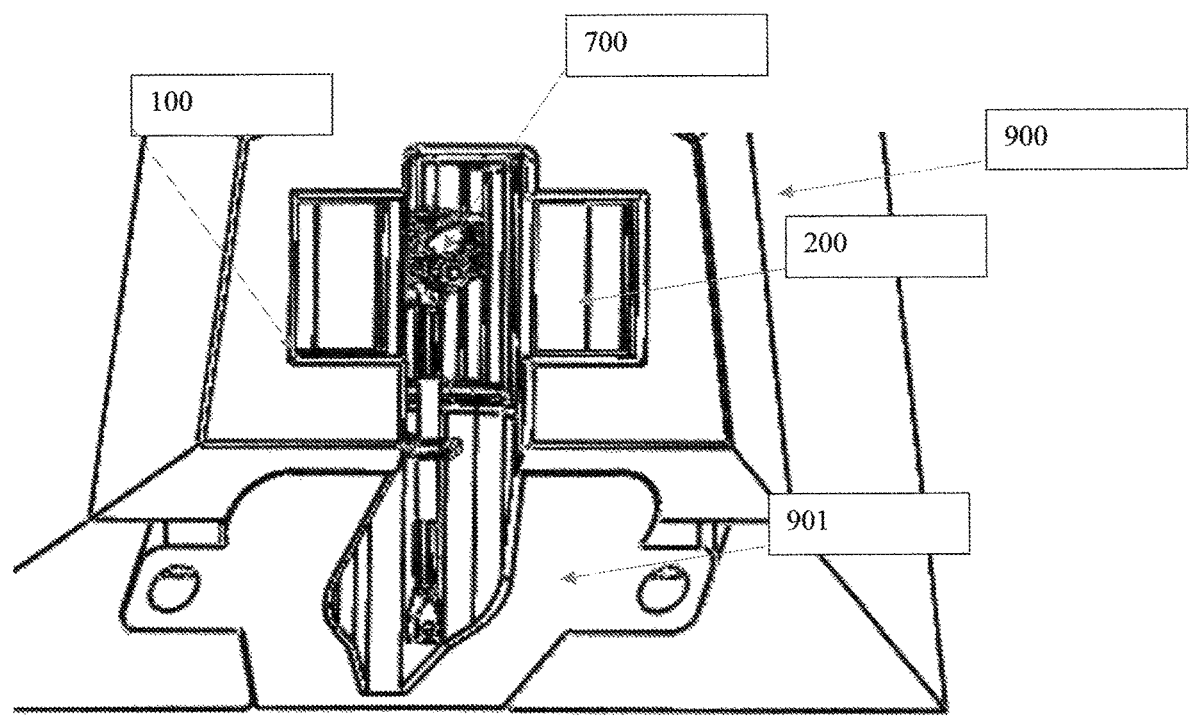
FIG. 15 is a diametric view of the I-TCD COVER/SHIELD (900) retaining the I-TCD (100), and BOTTOM PLATE (901), attached to the CLIMBING WALL SURFACE (800), with a CAM (700) between the I-TCD STONES (200) which are held captive within the I-TCD BODY

Attachment locations for CLIMBING HOLDS via T-NUT ACCESS POINTS can be any location around the volumetric areas not interfering with the access to place a piece or pieces of Traditional Climbing Gear or the access to attach to an anchor such as a carabiner or quick draw or piece of gear; as seen for example in FIG. 15.

Figure 10:
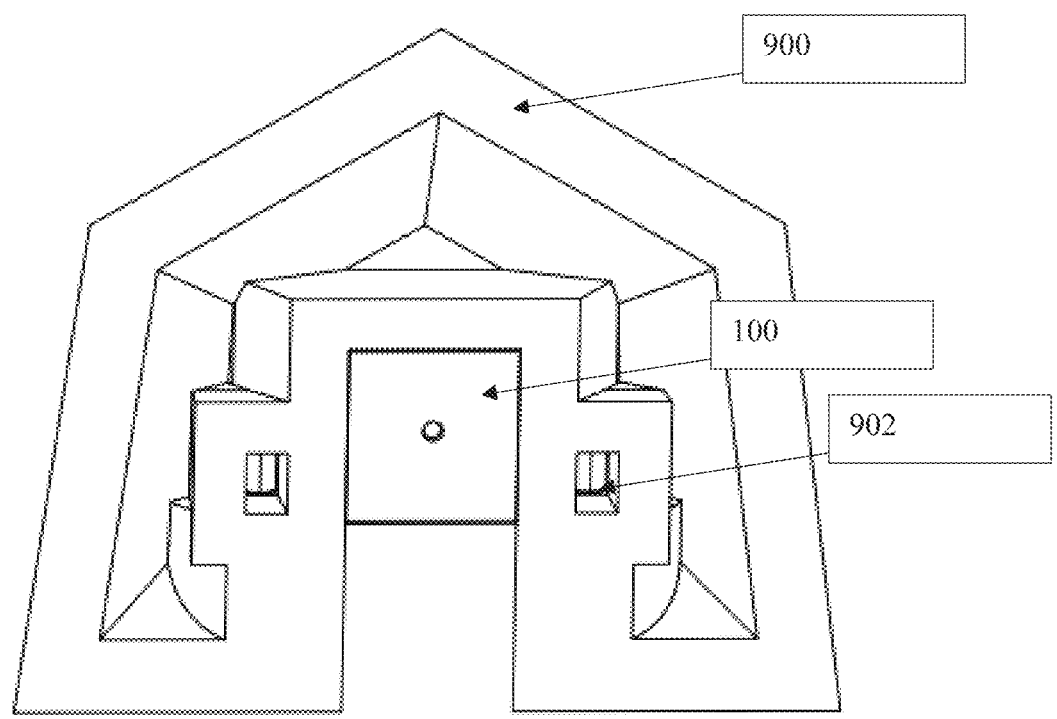
FIG. 10 is a rear view of the I-TCD COVER/SHIELD (900), showing the opening to the Climbing Wall which allows the I-TCD (100) to be fixed to the Climbing Wall by the Bolt which goes through the center of the I-TCD.

FIG. 10 Shows the rear view of the I-TCD COVER/SHIELD and the attachment/securement to the I-TCD BODY which can be done by shape (note shape of I-TCD BODY), specific feature, or mechanical item such as a screw. Also shown are the Cavity Features to allow for compression of the body to the Indoor Climbing Wall after placement over the I-TCD BODY. Additional surface screws around the outside of the I-TCD Cover/Shield can help secure the I-TCD Cover/Shield to the Climbing Wall as well, although by the nature of the fit to the I-TCD Body rotation of the I-TCD Cover/Shield should be minimal.

FIG. 10 also shows the Internal Capturing Nuts, and their insertion location that provides a coupling point for the Bottom Plate when bolts are threaded through its access holes. This feature mechanically secures the I-TCD Cover/Shield to the I-TCD Body.

Figure 11:
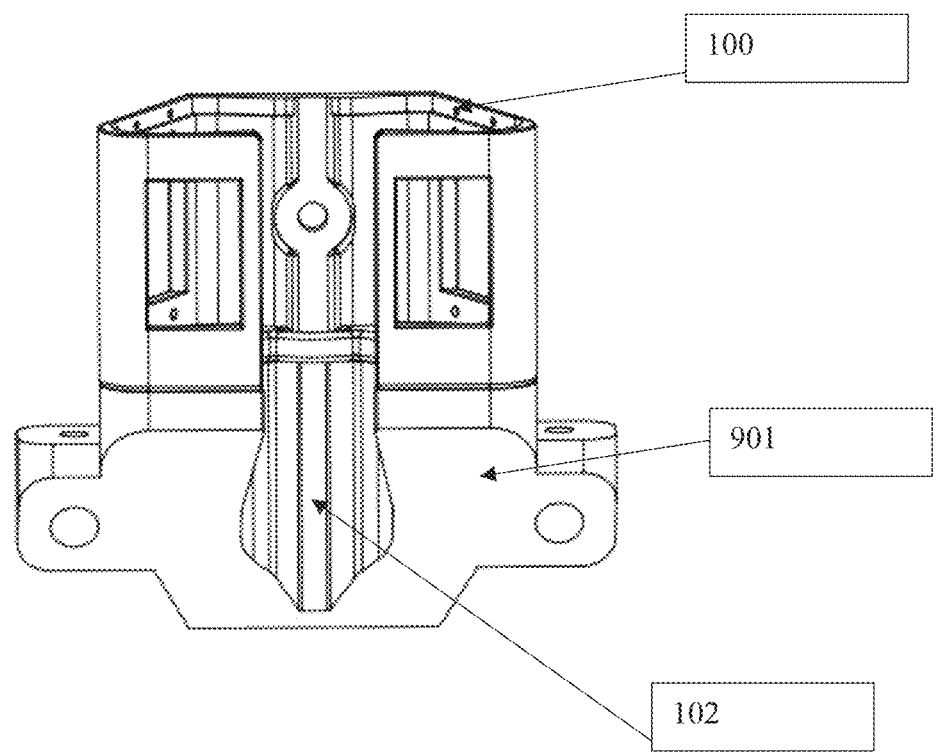
FIG. 11 is a front view of the I-TCD (100) seated on the BOTTOM PLATE (901), showing the access point for a Quick Draw, and the through holes in the Bottom Plate which allow a Bolt to couple the Bottom Plate to the I-TCD Cover.

FIG. 11 shows the form fit of the Bottom Plate to the I-TCD Body, as well as the Bottom Plates Access Holes which as noted above couple to the Internal Capturing Nuts.

Figure 12:
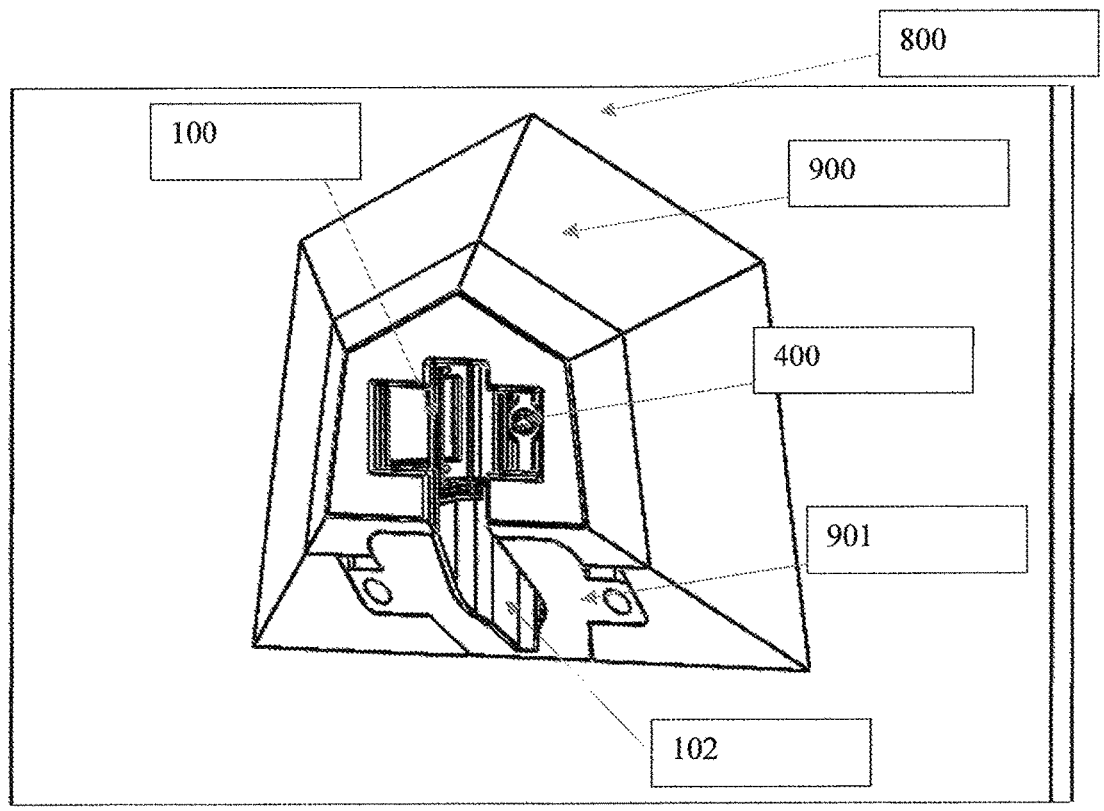
FIG. 12 is an isometric view of the I-TCD COVER/SHIELD (900), retaining the I-TCD (100), and BOTTOM PLATE (901), attached to the CLIMBING WALL SURFACE (800), using a BOLT (400)
Figure 13:
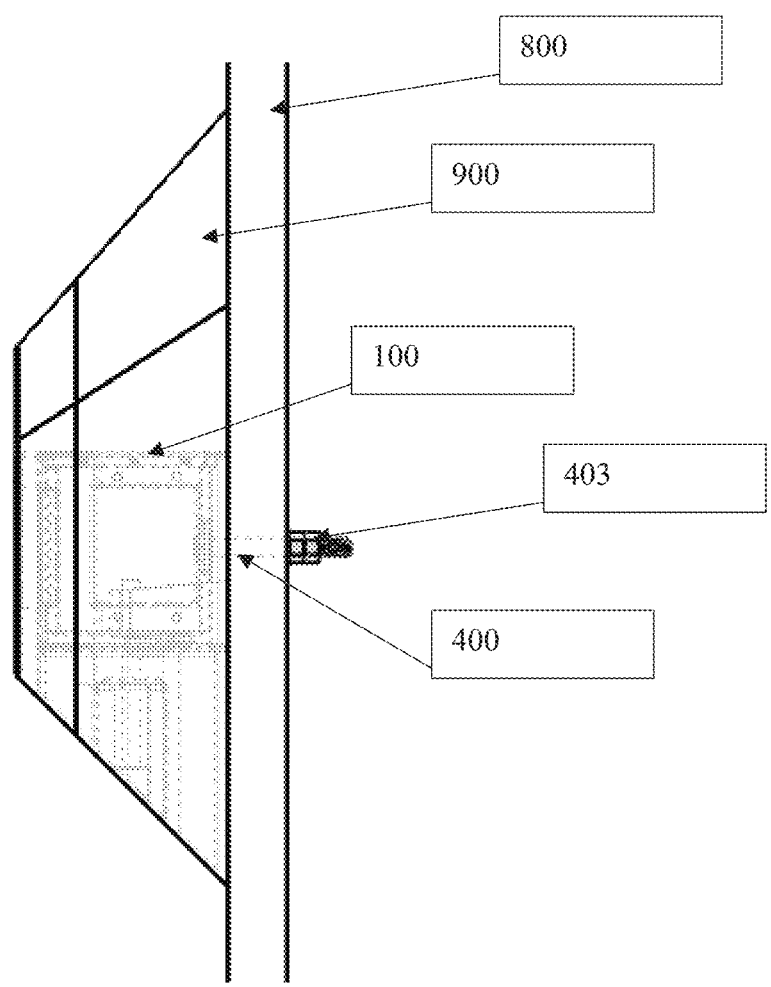
FIG. 13 is a side view of FIG. 12, the I-TCD COVER/SHIELD (900), retaining the I-TCD (100), and BOTTOM PLATE (901), attached to the CLIMBING WALL SURFACE (800), using a BOLT (400), and secured using one or more NUTS (401) (also shown but not labeled are the bolt through the Bottom Plate into the Internal Capturing Nuts)

FIG. 12 shows the sum of the aforementioned bodies attached to a climbing wall by a Hex Bolt, and FIG. 13 shows the internal view of the sum of these bodies to include the Hex Bolt, and retaining Nuts that hold the I-TCD Body to the Climbing Wall surface. It stands to note that the Body of FIG. 7 shown here in FIG. 13 is not specifically affixed to the Climbing Wall Surface, but rather is secured by its Internal Shape which conforms to the I-TCD External Shape in such a way as to prevent directional movement when the Bottom Plate is secured in place.

Figure 14:
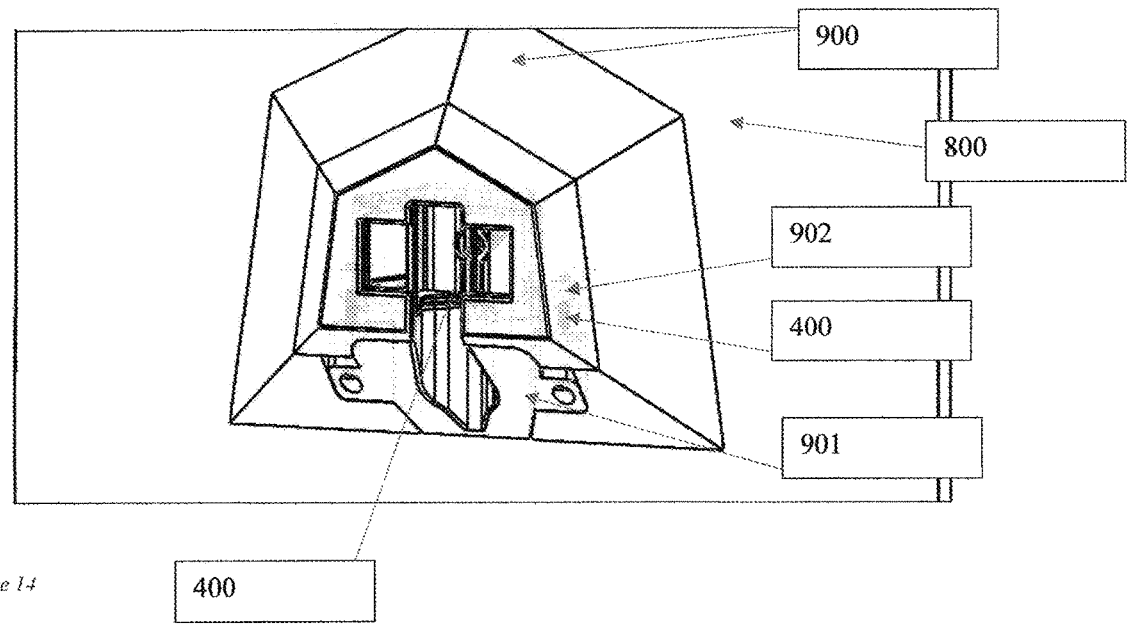
FIG. 14 is an isometric view of the I-TCD COVER/SHIELD (900), I-TCD, BOTTOM PLATE (901), attached to the CLIMBING WALL SURFACE (800), by the Nut (400) in the I-TCD, showing the BOTTOM PLATE Bolted (400) into the I-TCD COVER/SHIELD (900) through the Internal Captive Nut (902)

FIG. 14 shows the internal view of the Bottom Plate being secured in place by Bolts which are captured by the Internal Capturing Nut bodies, thereby securing the sum of the Bottom Plates, and the I-TCD Cover/Shield to the I-TCD Body and therefore to the Climbing Wall itself.

FIG. 15 shows the sum of the aforementioned bodies and adds the bodies of FIG. 4 (Stones), along with a Cam; which, when placed between the Stones becomes a Primary Anchor Point without impedance upon the Secondary Anchor Point noted in FIG. 1.

Figure 16:
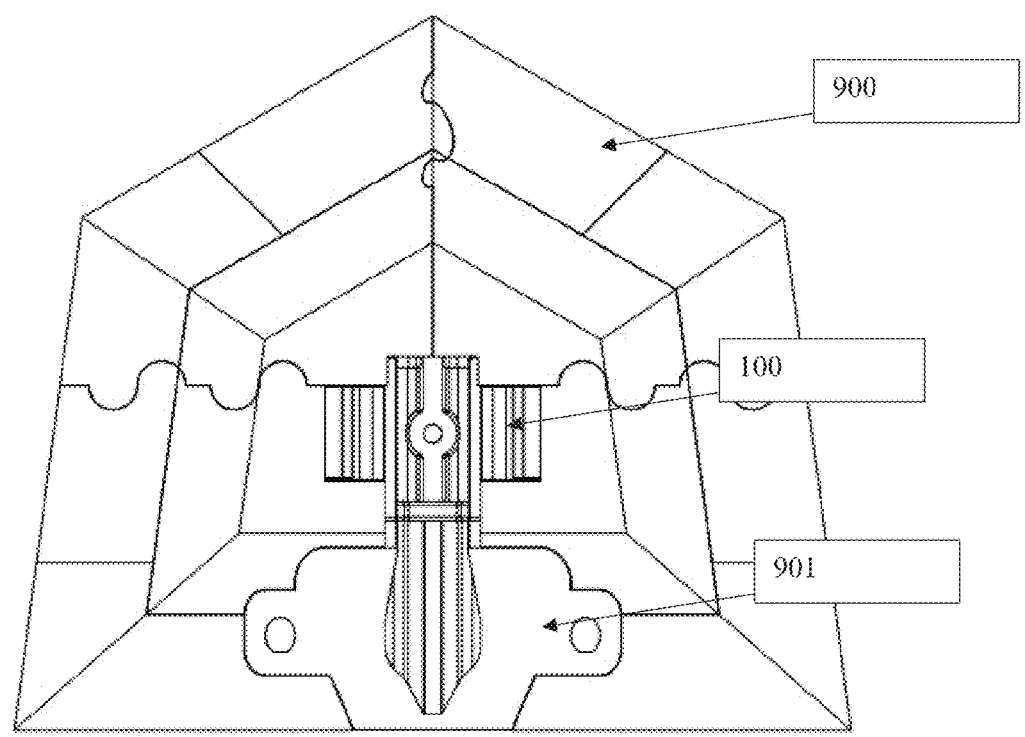
FIG. 16 is a view depicting a manufacturing, and assembly process for the I-TCD COVER/SHIELD (900). The curved and linear lines indicate points where this body can be divided for manufacturing and later assembly to reduce overall costs associated with manufacturing the I-TCD Cover as a single body.

Due to possible complications with manufacturing the body of FIG. 7, several manufacturing practices have been considered and modified for ease of manufacturing of the I-TCD Cover/Shield. FIG. 16 shows the manufacturing process of Dividing the total body into two or more parts to be later combined to create the total body. This creates a situation where some parts of the whole body can be injection molded while others can be CNC machined or all can be created by a single manufacturing process and then bonded to create the whole body.

Figure 17:
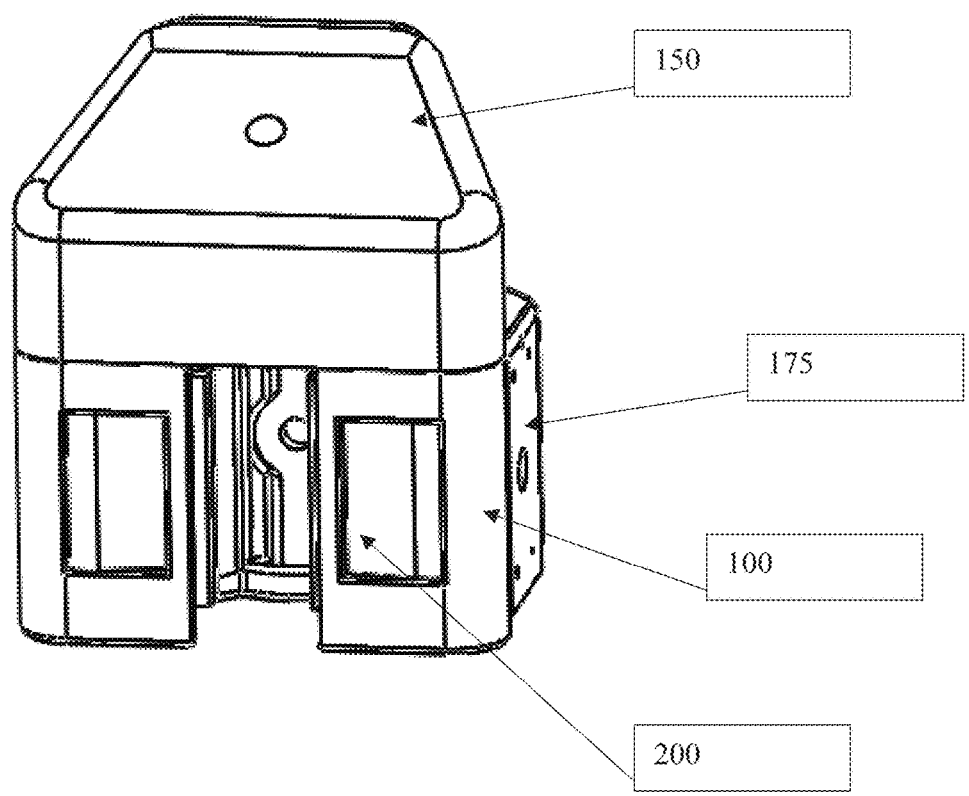
FIG. 17 is a view of a variation of the I-TCD COVER/SHIELD as three additional attachments (150) and two of (175). Where (150) is a Top Volume, and (175) is a Side Volume symmetrical sides and achieves the same purpose of creating a feature that removes the Shelf like feature of the I-TCD alone. This sum of bodies can be an individual body that simply and more specifically creates a "Helmet" like shape about the I-TCD body.

FIG. 17 notes that the I-TCD Body can be used on its own with additional Top, and Side Volumes that can themselves retain Climbing Holds or Features. The I-TCD Cover/Shield in some of its forms will take into account that it would be prudent to also be able to encompass these additional Top and Side Volumes into the same Cavity as the I-TCD Body for ease of use, while still retaining the ability to be secured to the Climbing Wall itself simply by the mechanical and or the shape of the bodies it's encompassing, shown in FIG. 23 in which the embodiment of FIG. 17 is encompassed by the body of FIG. 7.

This is accomplished whether there is simply the Top Volume on the I-TCD Body, or simply the Side Volumes on the I-TCD Body, or a combination of these bodies.

Additionally, this version of the I-TCD Cover/Shield can have horizontal access points FIG. 24, which access the Side Volume Center Hole T-Nut both to secure the I-TCD Cover/Shield to the I-TCD Body via the Side Volume and also to apply pressure to the Stones to tighten the Cam Access Point for a varying size of Cams.

Figure 18:
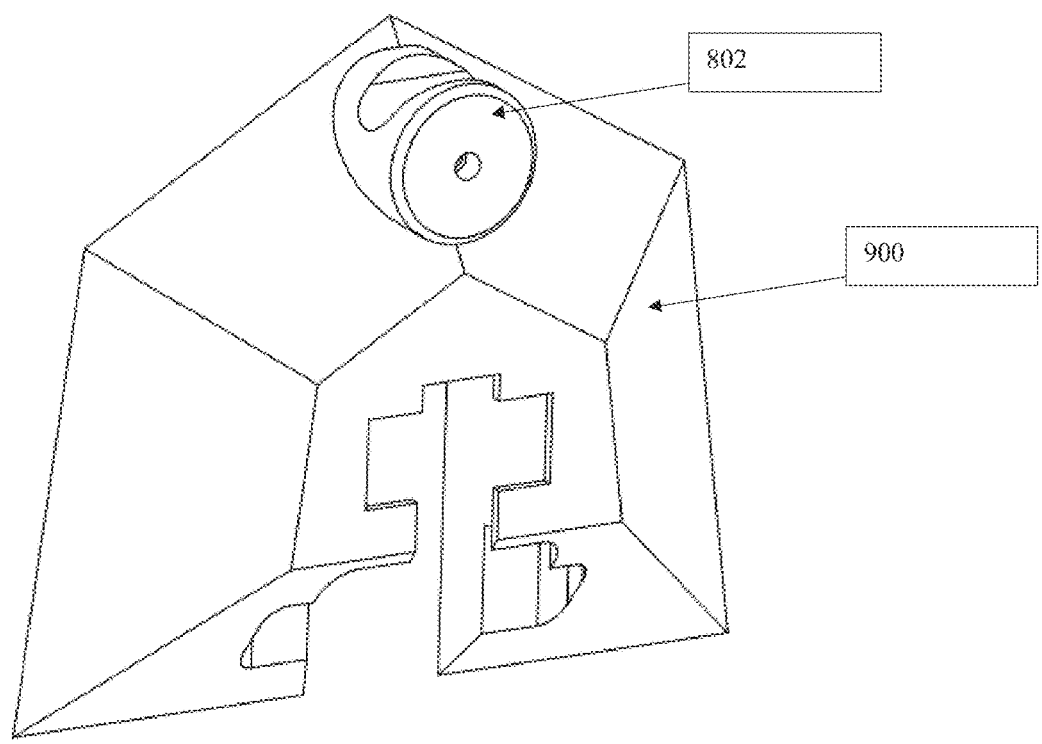
FIG. 18 is an isometric view of the I-TCD COVER/SHIELD (900) with an additional volume or Climbing Hold (802) on the outside of its body, such that it can be adapted for uses as a climbing surface

FIG. 18 shows a Climbing Hold Attached to the I-TCD Cover/Shield. This location is not fixed or specific and can be anywhere on the uppermost four faces.

Figure 19:
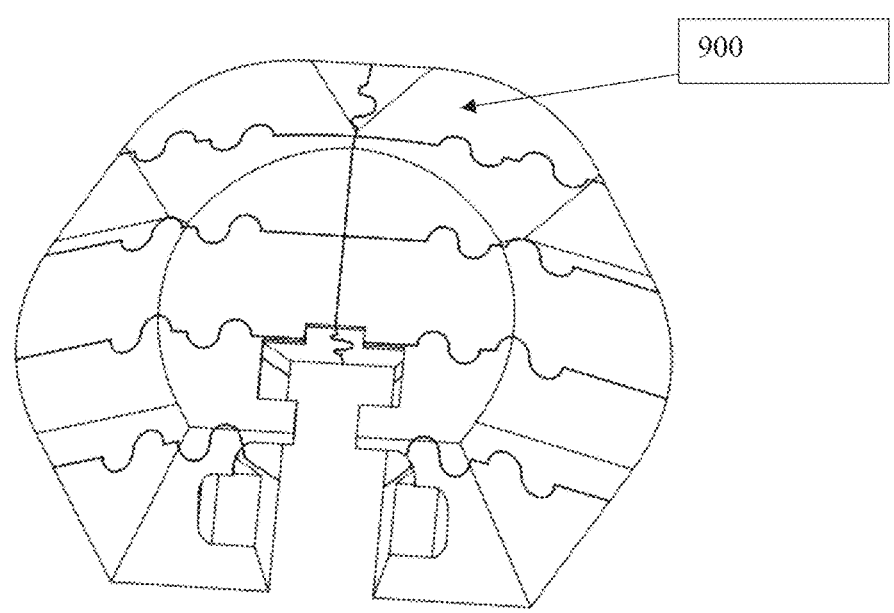
FIG. 19 is a view depicting a shape change from that of the pentagon shape of the (900) body to a more oval or egg-shaped body.
Figure 20:
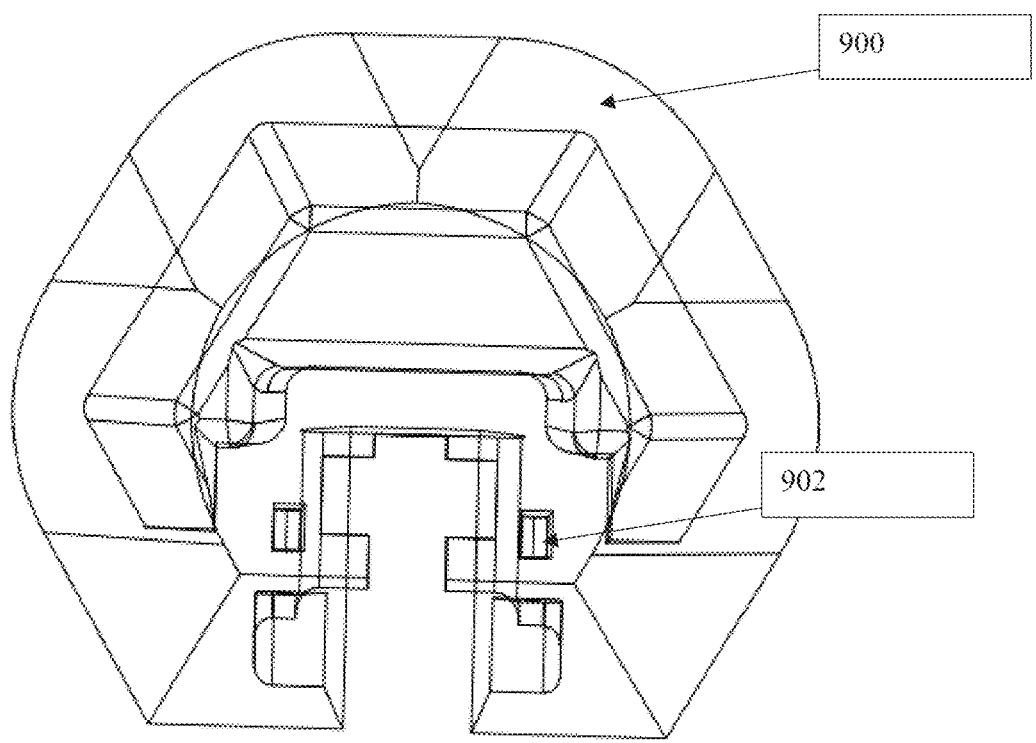
FIG. 20 is an internal view depicting shape change and a manufacturing process, and assembly process for the I-TCD COVER/SHIELD
Figure 21:
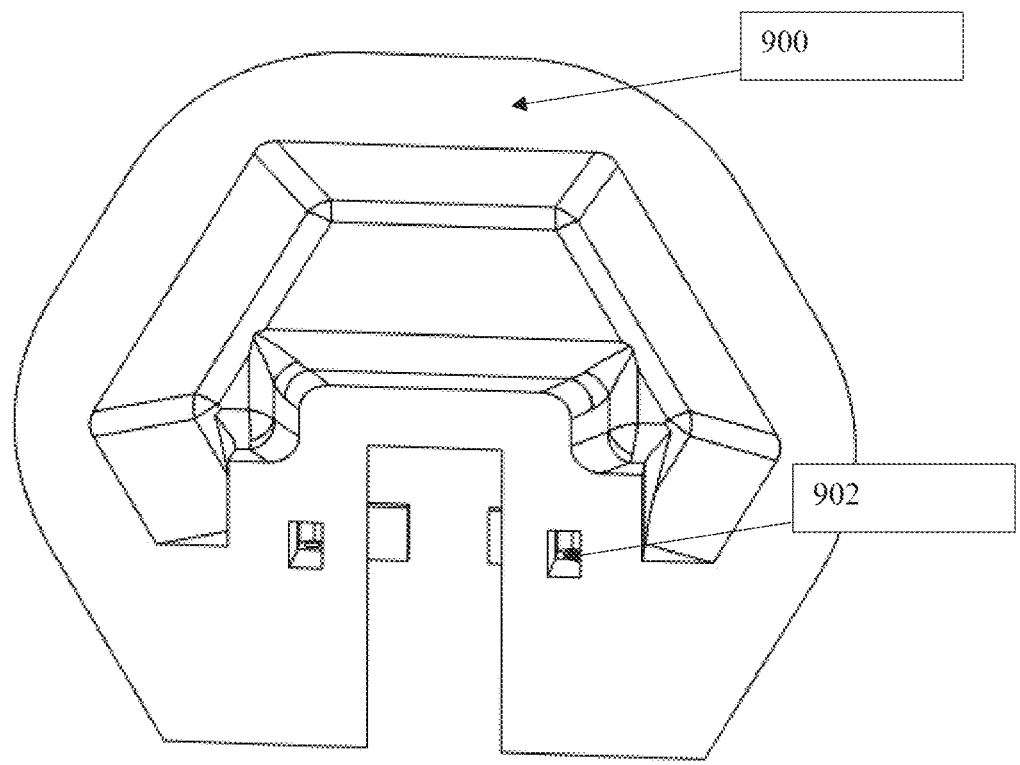
FIG. 21 is a rear view depicting a shape change noted in FIG. 20 for the I-TCD COVER/SHIELD (900), showing the Internal Capturing Nuts (902), which would still retain the Bottom Plate, and still have a cavity which could suction to the Climbing Wall Surface by the mechanics previously stated.

The advantages of the present invention include, without limitation, increased safety for the climber, increased opportunity for the route setter to switch out volumes on the I-TCD easily to increase the opportunity to put up a variety of climbing holds on and or about the I-TCD COVER/SHIELD. Thus the shape of the I-TCD COVER/SHIELD is not constrained to the shown pentagon shape, as one of ordinary skill can deduce that in "switching out" of volumes can be reasonably assumed to mean for a "volume" of different shape, feature, or likeness, with the same ability to attach to the mounting method previously used by the exchanged volume as shown in FIGS. 19, 20, and 21.

The I-TCD COVER/SHIELD relies upon the I-TCD BODY for structural mounting to the climbing wall FIG. 8 by use of features and/or mechanics; alone or in combination with hardware to affix the body to the climbing wall structure.

Figure 22:
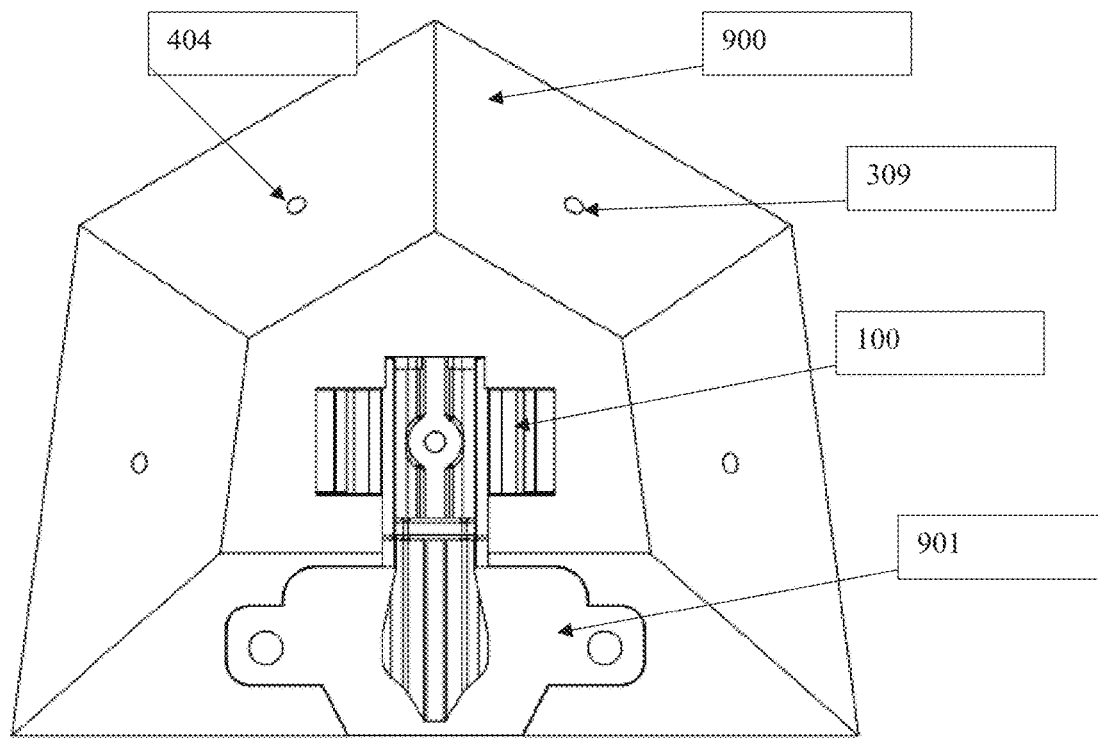
FIG. 22 is a view depicting the Sensor (309) and potential light and auditory alerts for the I-TCD COVER/SHIELD (900), and locations for additional climbing holds to be placed via T-Nuts located to the rear of (404).

Material selection will enable the body shown in FIG. 22 to have one or more internal LED's present, and or auditory alarms such that parts of or the entire body of FIG. 7 can be illuminated.

Figure 22B:
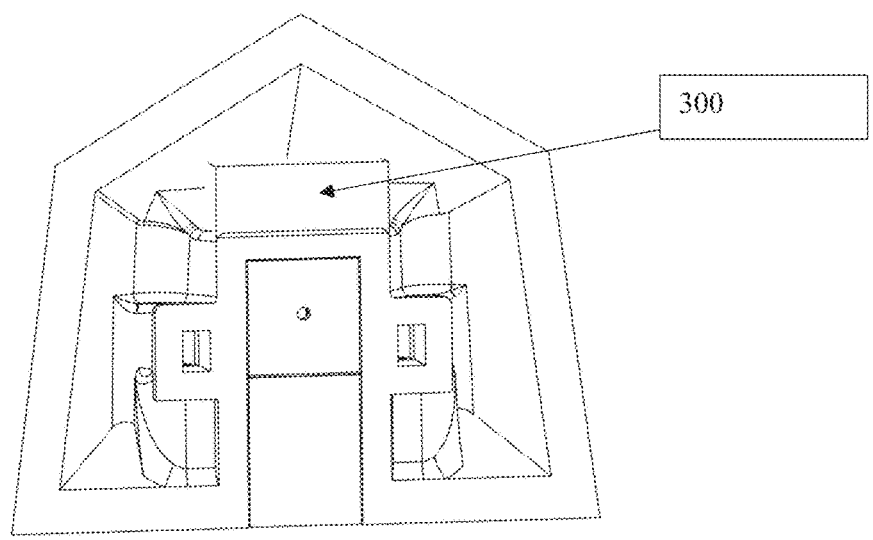
FIG. 22B also depicts power storage (300) location for the sensor, light, auditory attachments for the I-TCD COVER/SHIELD

The holes noted in FIG. 22 demonstrate possible locations for Climbing Holds to be attached via T-Nuts., and/or for sensors or auditory buzzers to be placed. While FIG. 22B shows where the circuit housing, power and microcontroller can be contained.

The I-TCD COVER/SHIELD in this embodiment has a Pentagon shape, variations of this embodiment can take any volumetric shape as an outer appearance so long as the interior cavity is specific to the I-TCD BODY FIG. 8 and Related Attachments (FIG. 17), and the methods of mounting claimed herein, as depicted in FIG. 23.

Notably in FIG. 24 is the placement of the Cam in relation to the Stones with an Engaging Member and Access Port through the I-TCD COVER/SHIELD that provides the Engaging Member with access to the Stones such that directional movement of the Engaging Member can increase of decrease the position of the Stones relative to the Cam such that a piece of Traditional Gear of larger or smaller size must be used to achieve an anchored position between the Stones.

This "Engaging Member" can take the form of a bolt, pin, set screw, screw, or spring actuated bolt, and is not limited to these items. While the purpose is the factor of importance; such being to engage the stone to increase or decrease the space between the stone's positions such that a variation in gear is required.

Additionally, The I-TCD COVER/SHIELD may require a manufacturing process that requires breaking the item up into several pieces for a molding process or into 2 or more pieces for a molding or casting process. In such cases, a puzzle like pattern can be used to create an increased surface area to bond the shapes back into a single piece.

FIG. 25 shows an example of a circuit containing an LED, Buzzer, Microcontroller, Capacitor, Resistor/s, Sensor (touch, vibration, pressure, force), relay, sink, and power source. It can also contain a Bluetooth component, Wi-Fi component, Li-Fi component, analog or digital counter by which to transmit the results of the sensor to a receiving device such that results of a competition or climbing event can be relayed to confirm a judge's decision as to the specific hold or height reached by a climber in relation to the noted volume. The purpose of this circuit is simply to demonstrate in one form that the specifics of the circuit itself are irrelevant in relation to the purpose. Such being to provide a Visual, and or Auditory, and or Data Transmission indicating that the I-TCD Cover/Shield has been reached by a climber, in any combination or individual form of these means.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited to the above described embodiment, method, and examples, but by all embodiments and methods within the scope and spirit of the invention.

DRAWINGS LEGEND

I-TCD Body 100
I-TCD Cap 125
I-TCD Stones 200
I-TCD Loop 101
Cavity for Access 102
I-TCD Top Volume 150
I-TCD Side Volume 175
I-TCD Access Point 102
Hardware:
   Bolt 400
   Nut 403
   T-nut location 404
Climbing Cam 700
Climbing Wall 800
Climbing Hold 802
I-TCD Shield 900
Bottom Plate 901
Internal Capturing Nuts 902
Side Access Port for Engaging Member 903
Circuit 300
   Voltage Source 301
   Relay 302
   Buzzer 303
   LED 304
   Microcontroller 305
   Mosfet 306
   Capacitor 307
   Resistor 308
   Sensor 309

The invention claimed is:

1. A cover for an indoor-traditional climbing device (I-TCD), wherein the I-TCD is a device configured for attachment to an artificial rock wall and is configured for placement of traditional rock climbing gear into a body of the device to create a traditional climbing anchor, comprising:
    a base plate having an opening, wherein the shape of the opening is configured to at least partially surround a portion of the I-TCD that is affixed to a surface such that the base plate is adjacent to the surface; and
    a housing extending from the base plate that is configured to at least partially enclose the I-TCD, wherein sides of the housing which extend directly from the base plate form an angle of less than 90° with respect to the base plate.

2. The cover of claim 1, wherein one or more sides of the housing comprise an opening configured to allow attachment of external climbing equipment to the I-TCD.

3. The cover of claim 1, wherein the base plate further comprises one or more cavities for mechanical attachment to the surface.

4. The cover of claim 3, wherein the one or more cavities are configured to receive an internal wrenching nut.

5. The cover of claim 1, wherein the base plate is configured to be compressed and/or suctioned to the surface.

6. The cover of claim 1, wherein sides of the housing form a pentagonal shape or an oval shape.

7. The cover of claim 1, wherein an external surface of the housing comprises a climbing hold.

8. The cover of claim 1, further comprising a sensor configured to transmit a signal when the cover has been touched.

9. The cover of claim 8, wherein the signal comprises an auditory and/or visual alert.

10. The cover of claim 1, wherein the base plate and housing are formed as a single piece.

11. The cover of claim 1, wherein the base plate and housing are formed as multiple pieces.

12. The cover of claim 1, wherein the housing further comprises one or more cavities configured to receive an engaging member that contacts a portion of the I-TCD.

13. The cover of claim 12, wherein the engaging member is a bolt or pin.

14. The cover of claim 1, wherein the configuration of the cover is such that after the base plate is placed adjacent the surface, the base plate is not moveable in an up or down direction.

15. The cover of claim 1, wherein the configuration of the cover is such that after the base plate is placed adjacent to the surface, the base plate is not moveable in a left or right direction.

16. The cover of claim 1, wherein the housing is formed from a plurality of overlapping pieces.

17. A method of mounting a cover onto an I-TCD, comprising:
    placing the cover of claim 1 onto an I-TCD such that the opening at least partially surrounds a portion of the I-TCD that is affixed to a surface, wherein the base plate is adjacent to the surface.

18. The method of claim 17, further comprising attaching the base plate to the surface via mechanical means.

19. The method of claim 17, wherein one or more sides of the housing comprise an opening configured to allow attachment of external climbing equipment to the I-TCD.

* * * * *